United States Patent [19]
Gaines

[11] 3,838,341
[45] Sept. 24, 1974

[54] UNDERSPEED/OVERSPEED DETECTOR
[75] Inventor: Donald Joseph Gaines, Lena, Ill.
[73] Assignee: Honeywell, Inc., Minneapolis, Minn.
[22] Filed: Jan. 2, 1973
[21] Appl. No.: 319,972

[52] U.S. Cl................ 324/161, 307/233, 324/78 Q, 328/140, 340/263
[51] Int. Cl. ............................................ G01p 3/56
[58] Field of Search .......... 324/161, 78 Q; 307/233, 307/234; 328/140; 340/263, 271

[56] References Cited
UNITED STATES PATENTS
3,619,651  11/1971  Aldrich ............................... 307/233
3,631,443  12/1971  Halfhill .............................. 340/263
3,728,553  4/1973   Wakamatsu ........................ 324/161

Primary Examiner—Michael J. Lynch
Attorney, Agent, or Firm—Philip J. Zrimsek

[57] ABSTRACT

A detection system for determining unacceptable deviations from a desired spacing pattern in the passage of articles past a station.

3 Claims, 3 Drawing Figures

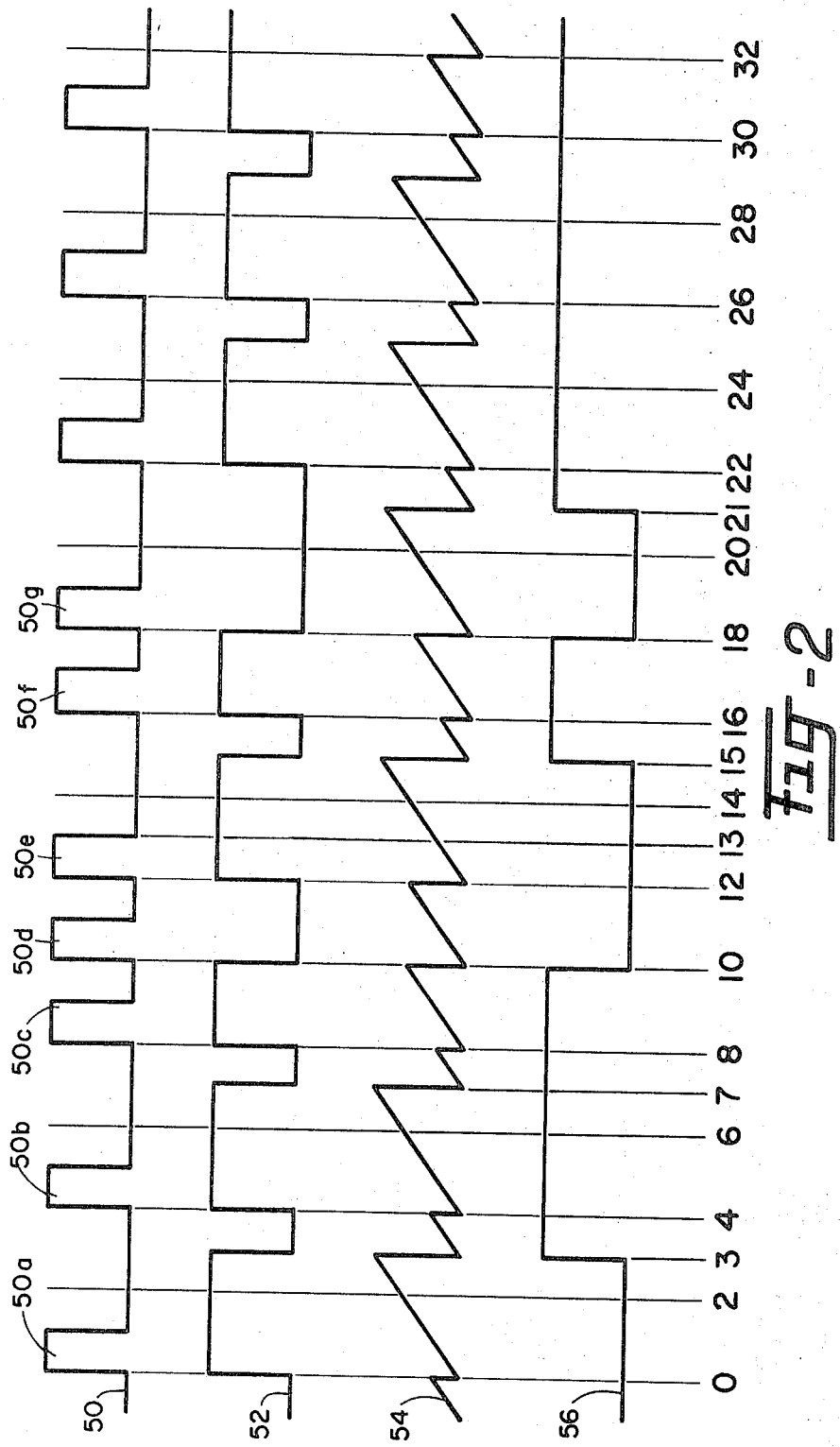

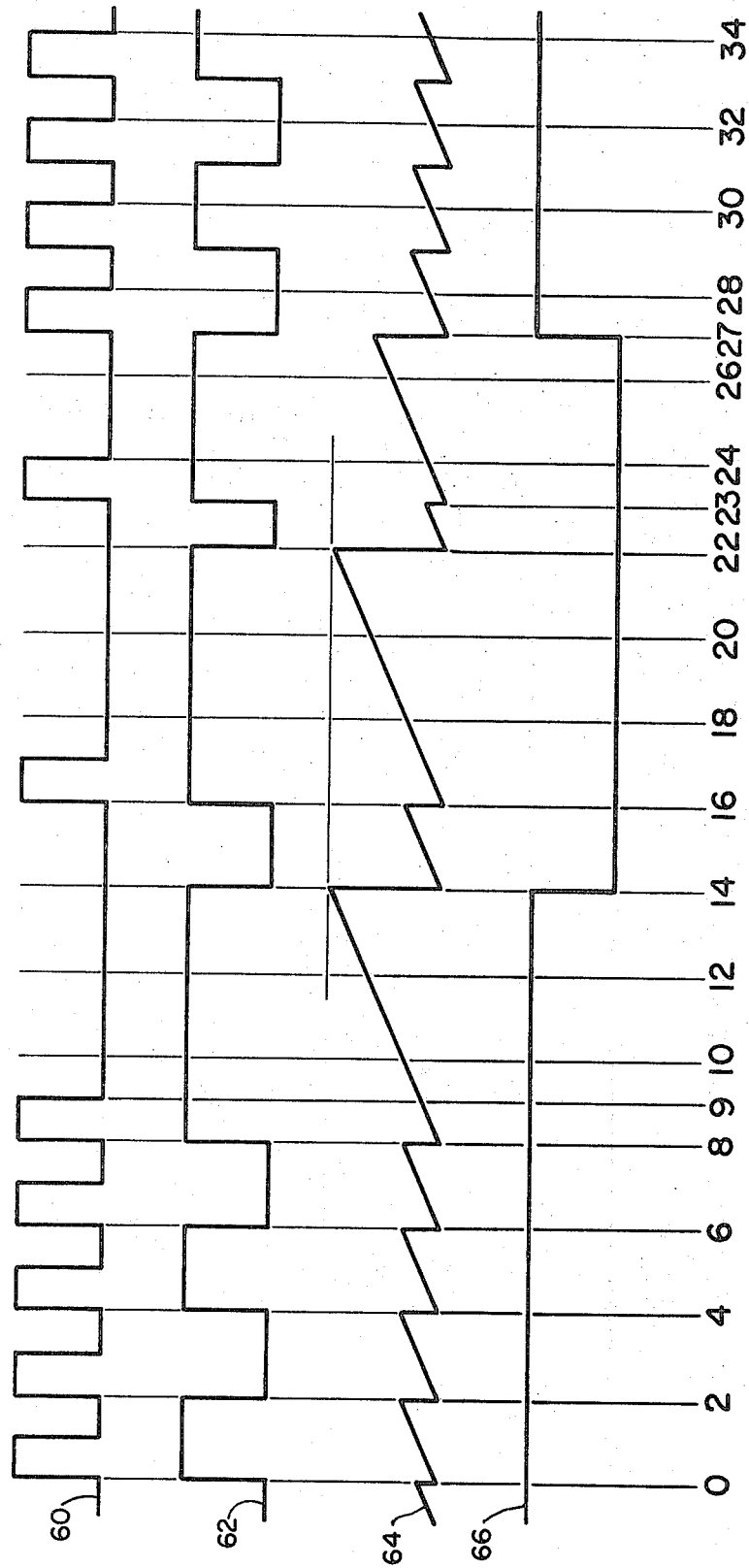

UNDERSPEED/OVERSPEED DETECTOR

The present invention is directed to an arrangement for determining an overspeed or underspeed condition with respect to the movement of articles past a specified position or station.

A problem with one form of conventional overspeed and underspeed detector is that the output follows the input. Thus, in this approach, immediately upon detecting unacceptable deviation from the desired condition, the detector is switched from one output condition to the other which of course is desirable. However, thereafter upon the first normal spacing, in the case of an overspeed detector, and the first article being sensed, in the case of an underspeed detector, the detector is switched back to its initial output condition. It will be appreciated that if the abnormal situation successively repeats, undesirable "chatter" in the output arises.

A problem with another form of conventional overspeed and underspeed detector is that the acceptable varying rates of speed of the articles past the station prior to the abnormal situation arising affects the time required for the detector to be switched from one output condition to the other. Thus, detectors utilizing integrators, such as capacitor charge and discharge approaches, suffer from this shortcoming in that the rate of speed of the articles past the station in the normal situation determines the charge on the capacitor and consequently determines the rate of decay or increase in charge when the abnormal situation arises, and hence, affects the response time of the detector.

My invention overcomes the shortcomings of chatter in the output and rate of speed sensitivity just identified by requiring not only the normal situation but an extension or repetition thereof to be sensed after an abnormal situation is encountered before the detector can be switched back to its initial output condition and by dispensing with integrators, respectively. The means for and the manner in which this is accomplished is specifically set forth below in regard to the preferred embodiment.

In view of the foregoing, it is an object of my invention to provide overspeed and underspeed detectors for determining unacceptable deviations from a desired spacing pattern in the passage of articles past a station which does not give rise to chatter in the output and which is not time sensitive in its operation upon encountering the abnormal situation due to the rate of speed of the articles moving past the station during the immediately preceding normal situation.

These and other objects will become more apparent from a reading of the following specification and appended claims taken in conjunction with the drawing in which:

FIG. 2 is a timing diagram of an underspeed detection system according to the invention illustrating the signals as they occur at respective time frames within the elements of the block diagram; and FIG. 3 is a timing diagram of an overspeed detection system according to the invention illustrating the signals as they occur at respective time frames within the elements of the block diagram.

Figure 1:
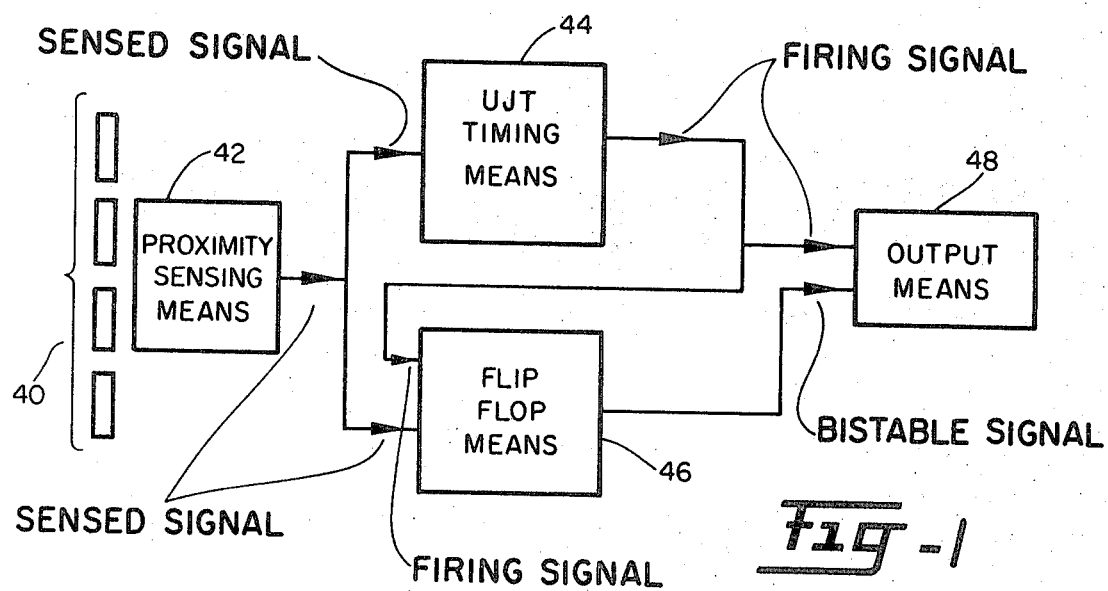
FIG. 1 is a block diagram of a detection system incorporating the invention hereof.

Referring now to FIG. 1, the block diagram there shown represents an article spacing detection system in the form of an overspeed/underspeed detector for determining unacceptable deviations from a predetermined norm with respect to the passage of articles 40 past a station in the form of a proximity sensing means 42 which can be of any desired type dependent upon the specific application such as all metals, ferromagnetic, photoelectric, etc.

As each article 40 passes the sensing means 42, a sensed, electrical pulse signal is generated and is fed by circuitry as a reset signal to a timing means 44 and as a toggle signal to a flip-flop means 46.

The timing means 44 preferably includes a unijunction transitor, not shown, which is resettable to a base condition upon each reception of a sensed signal but which is triggerable to provide an electrical firing signal upon the failure to receive a sensed signal for a pre-determined period of time. The timing means 44 also preferably includes a state of the art adjustment means to vary the period of time required to "fire" the unijunction transitor so as to give rise to a firing signal. The firing signal is transmitted as a set signal by circuitry to the flip-flop means 46 and to an output means 48 which preferably includes a latching circuit, not shown.

The reception by the flip-flop means 46 of a sensed signal causes the flip-flop means to assume one of its two alternate levels and a successive sensed signal causes the flip-flop means to assume the other of its levels. Further, the reception of a firing signal by the flip-flop means 46 causes the flip-flop means to assume a pre-determined one of its levels if not already at this level as will become more evident below. The flip-flop means 46 generates signals representative of the alternate levels as well as transition signals representative of the excursions therebetween. These bistable signals are transmitted as reset signals by circuitry to the output means 48.

The output means 48 is actuable from a first condition to a second condition upon reception of a firing signal from the timing means 44. The output means 48 includes logic well-known in art which causes it to remain in the second condition until such time as the output means receives a specific one of the two transition signals generated by the flip-flop means 46 and at which time no firing signal is received from the timing means 44.

For a better understanding of the foregoing and advantages the invention provides, a further explanation will be given first with respect to an overspeed detector and then with respect to an underspeed detector.

In FIG. 2, a timing diagram for an overspeed detector of the general form considered with respect to FIG. 1 is shown.

Line 50 of FIG. 2 includes sensed signals generated by the proximity sensing means 42. The spacing between signals 50a, 50b and 50c represents a normal situation with an acceptable spacing pattern of the articles 40 being sensed. In other words, the articles 40 are not passing the proximity sensing means 42 in an overspeed condition. This is also the case with respect to the spacing between signals 50e and 50f and from 50g onwards. However, the spacing between signals 50c, 50d and 50e as well as between 50f and 50g is unacceptable as it represents an overspeed condition.

It will be noted with respect to line 52, which represents the bistable signals on the flip-flop 46, that reception by the flip-flop means of a sensed signal, as at time frames 0, 4 and 8, for example, causes a change from one level to the opposite level to take place. This also takes place, referring to line 54 which represents the reset and firing signal of the timing means 44, upon the occurrence of a firing signal such as at time frames 3, 7 and 15, for example. However, it should be noted that at time frame 21 a firing signal occurs but no change in the bistable signal results as the flip-flop means 46 is structured as is well-known in the art to be responsive to firing signals so as to change from a 1 condition to a 0 condition but not to be responsive to firing signals when already in the 0 condition.

Line 56 represents the condition of or the signals arising from the output means 48. Initially, the output means 48 is in a 0 condition, but at time frame 3 a switching to the 1 condition takes place due to the occurrence of the firing signal. The 1 condition continues as long as the firing signals continue which of course indicates the normal situation insofar as passage of articles 40 past the proximity sensing means 42 is concerned. However, when the firing signals cease and a transition signal between the 1 condition and the 0 condition is generated by the flip-flop means 46, as at time frame 10, a switching of the output means 48 from a 1 condition to a 0 condition takes place. This occurs of course due to an abnormal situation arising in the passage of articles 40 past the proximity sensing means 42 as indicated by signals 50c and 50d. This abnormal situation continues as indicated by signal 50e and the output means 48 remains in the 0 condition. While a sensed signal does not arise at time frame 14, a switching of output means 48 does not arise as the system requires not only the normal situation, which in this case is the absence of sensed signals for two time frames, that is, at time frame 13 and time frame 14, but an extension of the normal situation, that is, an indication that no sensed signal will arise at time frame 15. Thus, when time frame 15 is reached with no concurrent sensed signal, the output means 48 is switched by the firing signal from a 0 condition to a 1 condition. By so structuring the system, the problem of chatter in the output means 48 is forestalled.

Another abnormal situation is indicated by signals 50f and 50g which of course causes a switching of output means 48 from a 1 condition to a 0 condition at time frame 18. Again, however, subsequent sensed signals occur in a manner to indicate a normal situation at time frame 21 whereupon still another switching of the output means 48 from a 0 condition to a 1 condition takes place.

In FIG. 3, a timing diagram for an underspeed detector of the general form considered with respect to FIG. 1 is shown. From a practical standpoint, the overspeed detector and the underspeed detector are the same system with only the effective time constant of the unijunction transitor, not shown, being varied by the adjustment means, not shown, so as to change the time required for the unijunction transitor to provide the firing signal. This will become apparent below. Further, so as to be able to identify whether overspeed or underspeed is involved, especially where both aspects are being simultaneously monitored by two such systems, an invertor in the output means 48 can be utilized.

Line 60 of FIG. 3 includes the sensed signals from the proximity switching means 42 and lines 62 and 64 represent the bistable signals of the flip-flop means 46 and the reset and firing signals of the timing means 44, respectively.

The sensed signals arising at time frame 0 through time frame 8 represent a normal situation in regard to underspeed. However, an abnormal situation is initiated beginning at time frame 9. It will be noted that the time constant of the unijunction transistor has been varied so that a time span from the base condition at time frame 8 until time frame 14 is required to give rise to a firing signal. When the firing signal does occur, the output means 48 is switched from a 1 condition to a 0 condition which is opposite to that which took place with respect to the overspeed detector and this is due to the inclusion of an invertor in the output means 48.

While sensed signals appear at time frames 16, 23 and 27, a switching of the output means 48 does not take place until time frame 27 as a transition signal between a 1 condition and a 0 condition is not generated by the flip-flop means 46 prior to time frame 27 except at time frame 22 when a firing signal also arises. In other words, the system requires not only the normal situation, which in this case is a sensed signal followed by a further sensed signal within a time interval represented by a span of five time frames, but also a transition signal from the 1 condition to the 0 condition generated by the flip-flop means 46 without the occurrence of a concurrent firing signal. Again, it will be appreciated that the system is so structured as to forestall chatter in the output means 48.

From the foregoing, it will be understood that I have conceived a system which eliminates the shortcomings of the earlier mentioned prior art article spacing detection systems. Other forms of my invention are possible. Therefore, the scope of my invention should be determined from the following claims.

I claim:

1. A detection system for determining unacceptable deviations from a desired spacing pattern in the passage of articles past a station comprising: sensing means for providing a sensed pulse signal upon the passage of an article past a station; timing means associated with said sensing means resettable to a base condition upon reception of a sensed signal and triggerable upon failure to receive a sensed signal for a pre-determined period of time thereby providing a firing signal; output means associated with said timing means actuable from a first condition to a second condition upon reception of a firing signal; and flip-flop means associated with said sensing means successively settable between a first level and a second level upon reception of successive sensed signals; said timing means also associated with said flip-flop means whereby reception of a firing signal thereby causes said flip-flop means to assume said first level; said flip-flop means also associated with said output means whereby bistable signals representative of said first and second levels and the transition signals therebetween are received thereby; said output means actuable from said second condition to said first condition upon reception thereby of and only of the transition signal arising due to the excursion of said flip-flop means between said second level and said first level.

2. The system of claim 1 being electrical in form and wherein said sensing means is a proximity sensor, wherein said timing means is of electrical analog form, wherein said proximity sensor, electrical analog timing means, flip-flop means and output means are electrically connected to pass signals, electrical in nature, therebetween and said output means is further electrically connected to provide a control signal therefrom.

3. The system of claim 2 wherein said electrical analog timing means incorporates a unijunction transistor to provide the resettable and triggerable functions.

* * * * *